United States Patent
Goel et al.

[11] Patent Number: 5,905,791
[45] Date of Patent: May 18, 1999

[54] METHOD AND APPARATUS FOR PROVIDING COMBINED COMMUNICATION SERVICES INCLUDING LOCAL SERVICE AND TOLL SERVICE

[75] Inventors: Anurag Goel, Tinton Falls; Nadine A. Guillaume, Marlboro, both of N.J.; Leticia Garcia Johnson, Arvada, Colo.; Robert Yaeger Peters Jr., Middletown, N.J.; Theodore Homer Vagelos, Bedminster, N.J.; Walter Paul Zahray, Matawan, N.J.

[73] Assignee: AT&T Corp., Middletown, N.J.

[21] Appl. No.: 08/787,421

[22] Filed: Jan. 23, 1997

[51] Int. Cl.$^6$ ................................................. H04M 3/42
[52] U.S. Cl. ...................... 379/220; 379/115; 379/207; 379/244; 379/246
[58] Field of Search .................... 379/111, 112, 379/113, 114, 115, 127, 207, 219, 220, 221, 242, 243, 244, 245, 246

[56] References Cited

U.S. PATENT DOCUMENTS

| | | |
|---|---|---|
| 4,577,066 | 3/1986 | Bimonte et al. ................... 379/243 |
| 4,757,267 | 7/1988 | Riskin ............................ 379/219 |
| 5,023,904 | 6/1991 | Kaplan et al. ................... 379/201 |
| 5,136,636 | 8/1992 | Wegrzynowicz .................. 379/201 |
| 5,442,689 | 8/1995 | Buttitta et al. .................. 379/211 |
| 5,506,897 | 4/1996 | Moore et al. .................... 379/201 |
| 5,533,111 | 7/1996 | Schlanger ....................... 379/201 |
| 5,574,780 | 11/1996 | Andruska et al. ............... 379/207 |
| 5,588,048 | 12/1996 | Neville .......................... 379/127 |
| 5,594,787 | 1/1997 | Ohshima et al. ................ 379/115 |
| 5,633,919 | 5/1997 | Hogan et al. ................... 379/115 |
| 5,748,724 | 5/1998 | Sonnenberg .................... 379/220 |

Primary Examiner—Scott Wolinsky

[57] ABSTRACT

An interexchange carrier (IXC) switch and an associated database route qualified calls dialed to local service provider (LSP) subscribers onto interconnecting facilitiies with local access settlement rates, thereby allowing a local rather than toll cost structure. The IXC switch and associated database operate with existing toll features including those features which translate a private dialed number into a public number. The IXC switch and associated database classify the call into a jurisdictional classification from a customer billing and feature application perspective, and from a routing perspective independent of the customer billing and feature application classification. The jurisdictional classification can include, example, local, toll, interLATA toll or intraLATA toll.

27 Claims, 3 Drawing Sheets

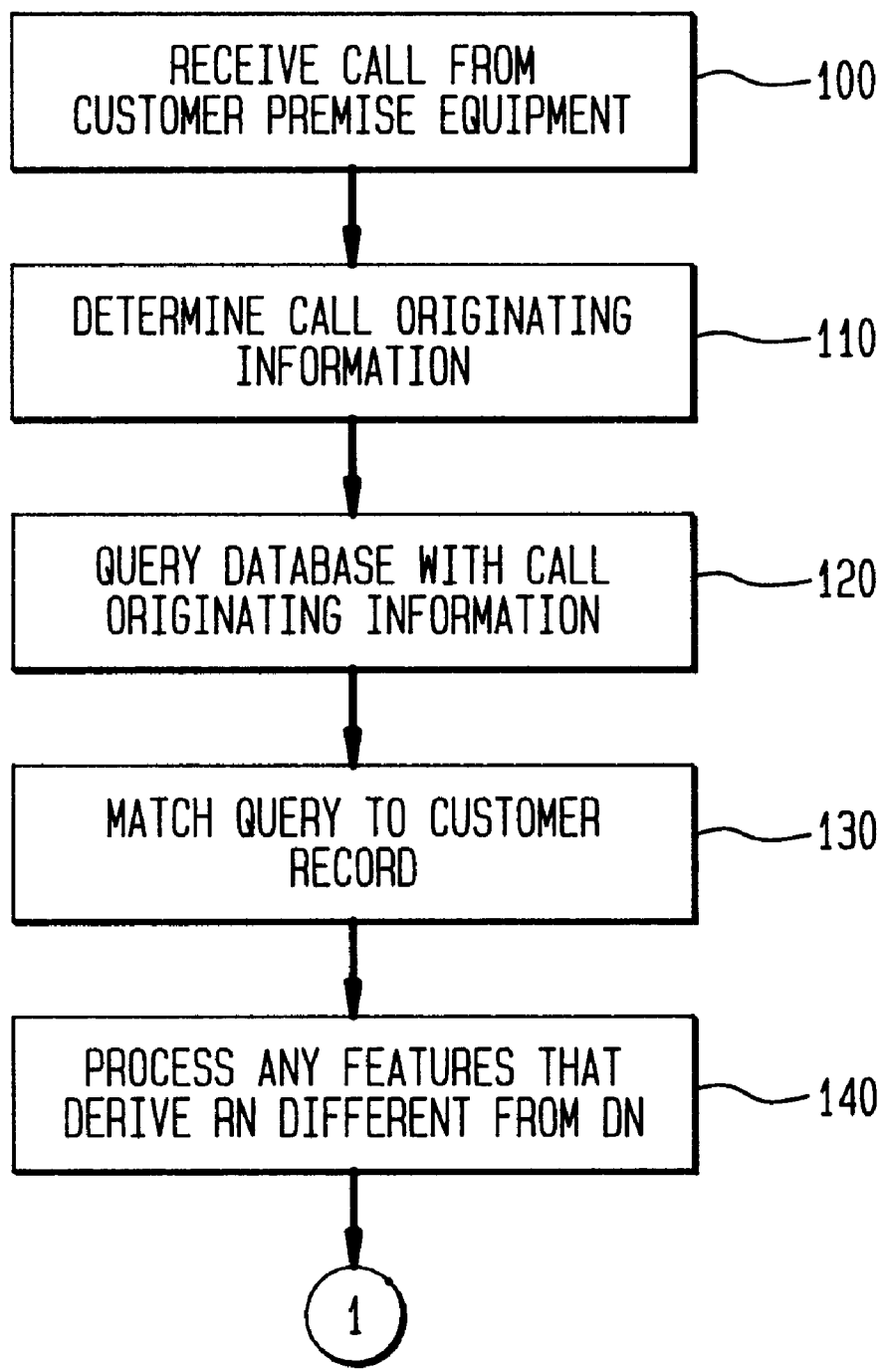

METHOD AND APPARATUS FOR PROVIDING COMBINED COMMUNICATION SERVICES INCLUDING LOCAL SERVICE AND TOLL SERVICE

FIELD OF INVENTION

The present invention relates to providing additional services to customers within a communication network. More specifically, the present invention provides local service capabilities to nodal customers through an originating switch having both local and toll capabilities.

BACKGROUND

Conventional system for originating and receiving telephone calls, particularly long distance or international telephone calls, typically involve routing through the facilities (e.g., switches) of a local service provider (LSP), i.e., local exchange carrier (LEC) in the United States. With respect to outgoing calls placed from a subscriber location, the LSP switch serving the subscriber's customer premises equipment (CPE) senses an off-hook condition and extends dial tone. Alternatively, the CPE may extend dial tone to the end user, analyze the dialed digits, seize an appropriate trunk for routing the call and send the dialed digits to the LSP switch. When the dialed digits are received in the LSP switch, any features associated with the originating subscriber, such as speed dialing, are applied to the call, and the call is then routed to the desired destination. If the call is a long distance call that is thereafter routed to a long distance or interexchange carrier (IXC) such as AT&T, then the IXC will pay the LSP for servicing the call, in the form of an "access charge", and the subscriber pays the IXC for the call, and pays the LSP and/or IXC for any originating features provided.

With respect to incoming calls received at a called party location, a similar condition prevails. Long distance calls destined for a called party are routed by the IXC to the terminating switch or associated tandem switch operated by the LSP that services the called party location. At the LSP terminating switch, any features associated with the called subscriber location, such as call forwarding and distinctive ringing, are applied to the call, and the call is then completed. Again, the IXC will pay the LSP for servicing the call, in the form of an "access (or egress) charge", and the subscriber will pay the LSP for any terminating vertical services provided.

One prior art system has attempted to allow the CPE to exchange information directly with the IXC switch while bypassing the access/egress charges associated with routing calls through LSP switches. U.S. Pat. No. 5,533,111 issued to Schlanger, on Jul. 2, 1996 and assigned to AT&T Corp., herein incorporated by reference, utilizes a "virtual pipe" to establish a virtual connection between the CPE and the IXC switch through the LSP network. Once the virtual pipe is established, the subscriber can originate calls to the IXC switch without being detected by LSP and without affecting the connection that exists through the LSP switch. The Schlanger system, however, suffers from routing the call through the LSP switch and, therefore, relying on the LSP to provide the hardware connection at reasonable access rates.

In addition to being connected through a traditional connection to a LSP switch, a business' CPE, such as a private branch exchange (PBX), can also be connected through a nodal connection to an IXC switch, for example a 4ESS™. A nodal connection is a direct transmission path from the CPE to the IXC switch without being routed through a LSP switch. By taking advantage of the direct connection between the CPE and the IXC switch and by allowing the IXC switch to support at least a subset of local call functionality, the disadvantages of the prior art can be overcome while allowing the IXC to route some calls as local calls that otherwise would be routed to the LSP switch at toll rates.

Several problems, however, prevent an IXC switch from easily supporting at least a subset of local call functionality to customers connected by a nodal connection. First, the IXC switch must distinguish a local call from a toll call from any other type of call. Typical interconnection arrangements between carriers define higher access rates for toll calls delivered to an LSP for completion, compared to the corresponding rate for local calls. Because an IXC switch supporting at least a subset of local call functionality would receive both toll calls and local calls, the IXC switch must distinguish a local call from a toll call from any other type of call or else the IXC switch cannot support routing with local access rates and would be limited to the IXC toll access rates with the LSP.

Second, to develop competitive offers to customers, an IXC switch supporting at least a subset of local call functionality must classify a call as local or toll for customer billing and billing related features independent of whether a call is eligible for delivery to the LSP network for completion at local or toll rates. For example, a call eligible for delivery to another LSP for completion only at toll access rates may be billed to the customer as either a local or toll call, depending on the calling offer the IXC has extended to the customer. Similarly, a call eligible for delivery to the LSP for completion at local access rates may be billed to the customer as either a local or toll call, depending on the calling offer the IXC has extended to the customer.

SUMMARY OF THE INVENTION

The present invention allows an IXC switch and an associated database to route qualified calls dialed to LSP subscribers onto interconnecting facilities with local access settlement rates, thereby allowing a local rather than toll cost structure. The present invention operates with existing toll features including those features which translate a private dialed number into a public number.

The present invention allows an IXC switch and associated database to classify the call into a jurisdictional classification from a customer billing and feature application perspective, and from a routing perspective independent of the customer billing and feature application classification.

The present invention provides combined local service and toll service to a calling party through a switch connected to a communication network. The switch receives a dialed number from the calling party. The call is associated with a billing number based on the trunk group data identifying the connection through which the dialed number was received. The call is also associated with a geographic location of the calling party. A database is queried to obtain a jurisdictional classification of the call and to process features, based on the billing number, the geographic location and/or the dialed number. During the querying of the database, a feature is processed based on the billing number and/or dialed number. During the querying of the database, the call is classified into a jurisdictional classification based on the calling party geographic location and the called party geographic location. The called party geographic location is determined from the dialed number and can be simply the dialed number or can be a routing number translated from the dialed number. Routing information is returned from the database to the switch based on the jurisdictional classification of the call. The call is routed based on the jurisdictional classification of the call.

The processing performed during the querying of the database can be divided between processing performed before and processing performed after the call is classified into a jurisdictional classification. Before classifying the call, a first feature can be processed based on the billing number card/or the dialed number; after classifying the call, a second feature can be processed based on the billing number, called party geographic location and/or the jurisdictional classification of the call. Alternatively, a feature can be processed only before classifying the call or only after classifying the call. The database contains a customer record accessed during feature processing based on the billing number and/or the dialed number.

The routing information returned to the switch can also be based on feature processing. Additionally, the jurisdictional classification can be recorded at the switch. The jurisdictional classifications can be local, toll, intraLATA toll, interLATA toll or other classifications.

Call classification can be performed from a routing perspective and from a billing perspective. The calling party geographic location can be determined by the billing number or any parameter associated with the trunk group data other than billing number. For example, the calling party geographic location can be determined from a local automatic number identification (LANI) parameter associated with the trunk group data.

Feature processing can include playing a message to the calling party and receiving a response from the calling party through the switch. The response from the calling party can include a dual tone multi-frequency (DTMF) audio signal or speech by the calling party.

BRIEF DESCRIPTION OF THE DRAWINGS

FIGS. 2A and 2B together provide a flowchart illustrating the manner in which a call is processed according an embodiment of the present invention.

DETAILED DESCRIPTION

Figure 1:
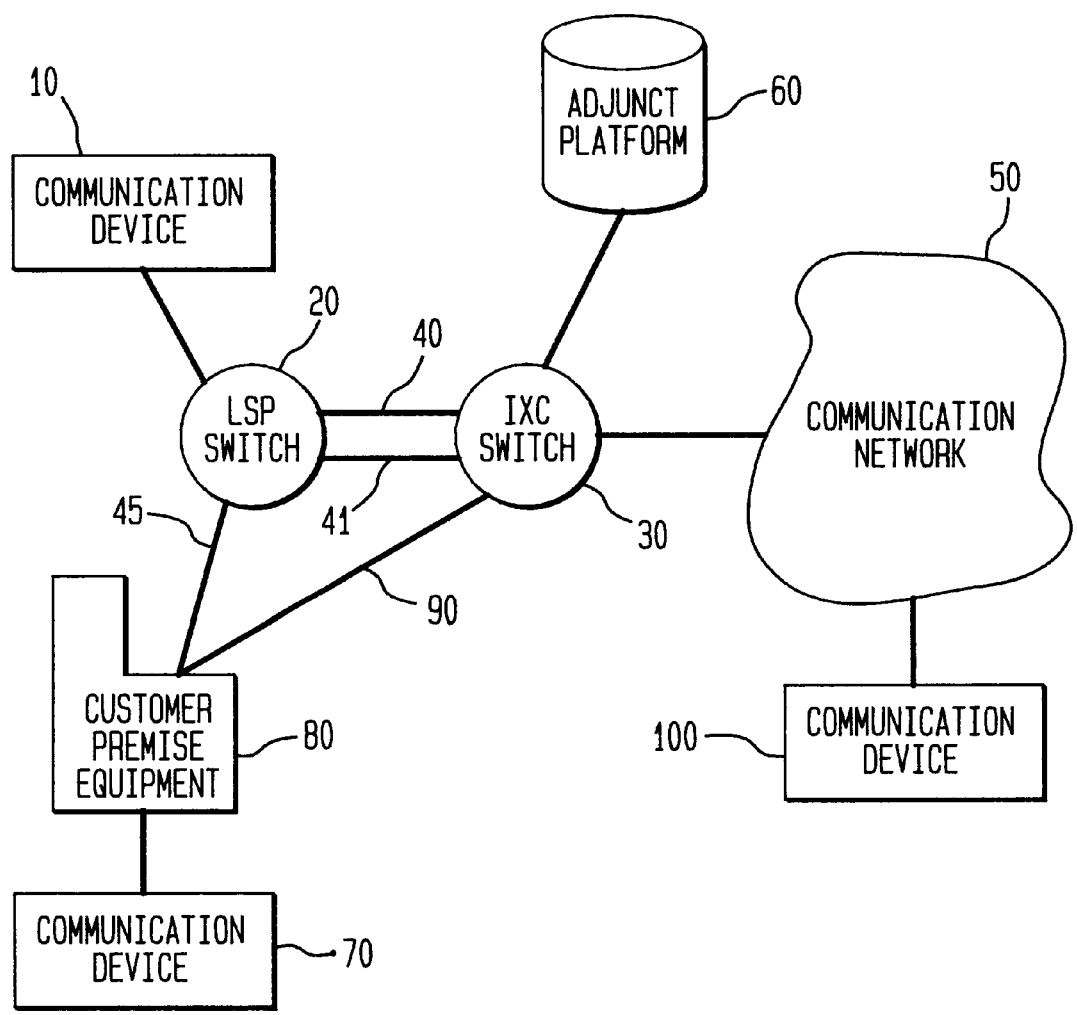
FIG. 1 shows a communication system according to an embodiment of the present invention.

FIG. 1 shows a communication system according to an embodiment of the present invention. Communication device 10 is connected to LSP switch 20 which is in turn connected to IXC switch 30 over traditional connection 40. IXC switch 30 is also connected to LSP switch 20 over connection 41 which is a connection for the exchange of local calls at local access rates. IXC switch 30 is connected to communication network 50 (e.g. the Public Switched Telephone Network—PSTN) and connected to adjunct platform (AP) 60. Even though IXC switch 30 is referred to as an IXC switch for convenience of notation, the present invention allows this switch to support both toll call functionality and local call functionality; IXC switch 30 is also referred to herein as an originating switch.

AP 60 includes a database containing customer records, such as customer profile information and service feature information. The service feature information can be customer specific or service specific centrally located in modular form or repeatedly located in each customer record. Alternatively, the database containing customer records can be contained within IXC switch 30.

Communication device 70 is connected to CPE 80 which includes any type of equipment used by a business or premise with a large number of lines, such as a PBX. CPE 80 is connected to both LSP switch 20 over traditional connection 45 and to IXC switch 30 over nodal connection 90. Alternatively, CPE 80 can be connected to IXC switch 30 over nodal connection 90 only. Communication device 100 is also connected to communication network 50.

Communications devices 10, 70 and 100, can be any of a variety of types, such as a telephone or a personal computer. Communication devices 10, 70 and 100 transmit and receive information through LSP switch 20, IXC switch 30, communication network 50, and/or CPE 80. The term "information" as used herein is intended to include data, text, voice, and video.

A caller can initiate a call, for example, by dialing a desired phone number whereby conventional dual tone multi-frequency (DTMF) audio signals are transmitted to LSP switch 20, IXC switch 30, CPE 80 and/or communication network 50. Other signaling methods can also be used, such as multi-frequency (MF), integrated services digital network (ISDN) or Signaling System No. 7 (SS7), as alternatives to DTMF signaling. Communication network 50, LSP switch 20, IXC switch 30 and CPE 80 utilize computer processors and software to detect the signals and to connect the caller, for example at communication device 70, to the communication device of the called party, for example at communication device 100.

As illustrated in FIG. 1, a caller at communication device 70 can make or receive a call through CPE 80. The present invention allows the call to be routed over nodal connection 90 through IXC switch 30 while bypassing traditional connections 40 and 45 and LSP switch 20, regardless of the type of call, e.g., a local call or a toll call. For example, when a call is placed from communication device 100 and the called party is at communication device 70, the present invention allows IXC switch 30 to route the call over nodal connection 90 through CPE 80. In such a case, a LSP switch (not shown) that services communication device 100 determines the call is an interLATA and routes the call to an IXC switch (not shown) for the subscriber associated with communication device 100. The IXC switch associated with communication device 100 utilizes the DN to select IXC switch 30 as the appropriate terminating switch for the call. The present invention then allows IXC switch 30 to route the call over nodal connection 90 through CPE 80 to communication device 70. Thus, the LSP switch 20 is completely bypassed and the associated access charges are not incurred.

Similarly, the present invention allows a call to be routed through the LSP switch 20 with a local rather than a toll cost structure. For example, when a call must be routed through the LSP switch 20, for example a call placed from communication device 70 to a called party at communication device 10, the present invention allows IXC switch 30 to receive the call over nodal connection 90 without incurring access charges from the LSP and then to route the call over connection 41 through LSP switch 20 while incurring local access charges only.

As these examples illustrate, it is advantageous for IXC switch 30 to distinguish the type of call from two perspectives: a billing perspective and a routing perspective. In other words, when IXC switch 30 receives a call, the IXC processing of the call should distinguish whether the customer will be billed for a local or toll call, so that appropriate features can be applied to the call and the billing record can indicate the jurisdictional classification. When the called party is served by another LSP, the IXC processing of the call should also determine whether the call is eligible for routing on interconnecting trunks at local access rates. Thus, each call must be evaluated from a billing perspective and from a routing perspective.

Note that although the present invention is discussed in terms of a local call or a toll call, the present invention is not limited to only local and toll calls. The present invention is applicable for any number of call jurisdictional classifications. For example, the calls could be classified as local calls, intraLATA toll calls, and interLATA calls. Considering the simplest case where the call is either a local call or a toll call, the call is processed as one of four possibilities: (1) a local routed, local billed call; (2) a toll routed, toll billed call; (3) a local routed, toll billed call; and (4) a toll routed, local billed call.

Figure 2B:
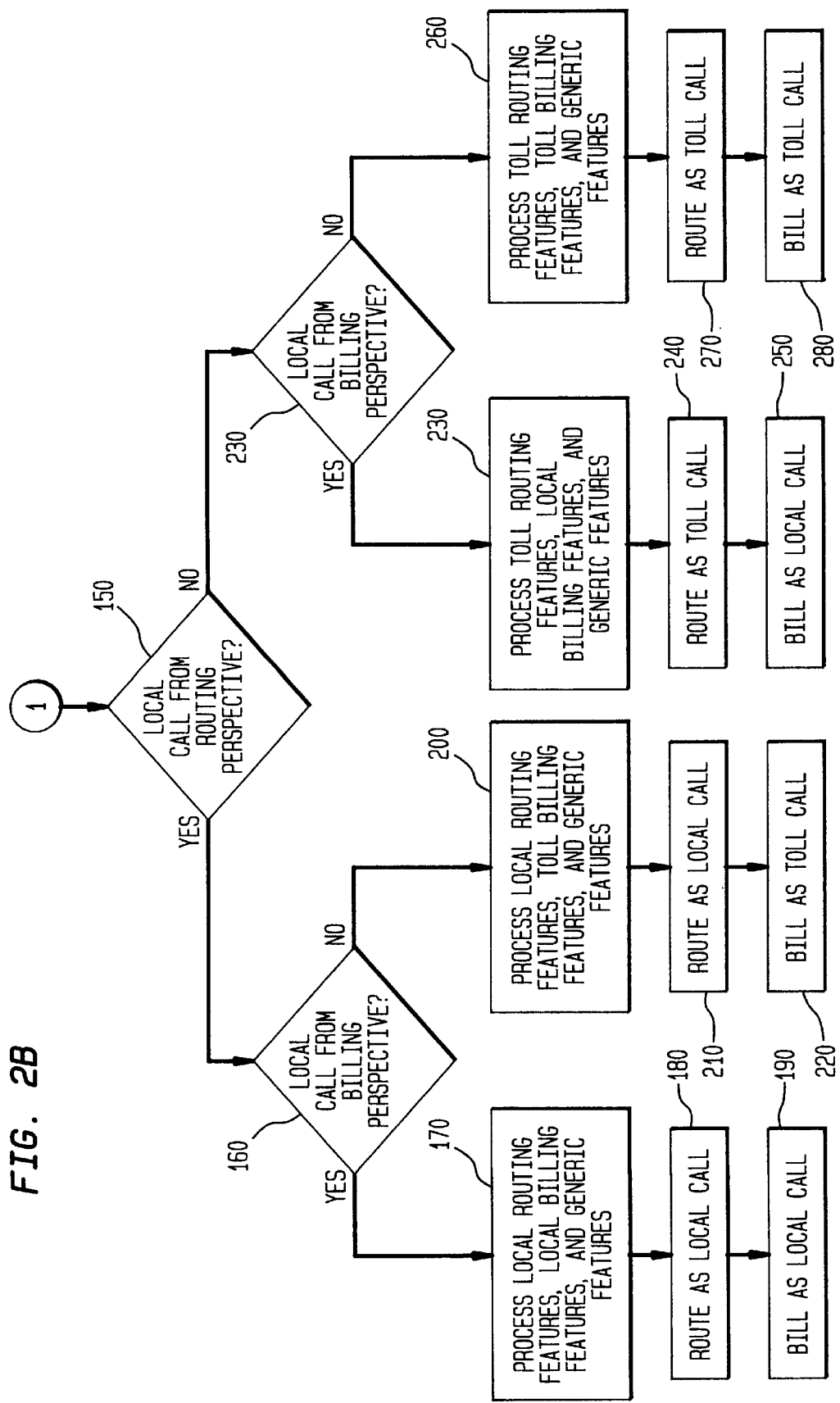

FIGS. 2A and 2B together provide a flowchart illustrating the manner in which a call is processed according to an embodiment of the present invention. The process starts at step 100 where IXC switch 30 receives call setup information, including the dialed number (DN), from the CPE 80. Control then passes to step 110. At step 110, IXC switch 30 collects the DN from the call setup information and determines call originating information from trunk group data. Call originating information can include a billing number to identify the customer location and a local automatic number identification (LANI) parameter to identify the geographic location (e.g., NPA-NXX) of the calling party. The LANI parameter can be any parameter of the trunk group data other than the billing number. Alternatively, the geographic location of the calling party can be embedded in the billing number or can be contained in the database on AP 60 and obtained by step 130 described below. Control then passes to step 120.

At step 120, IXC switch 30 queries the database located at AP 60 with the call originating information including the billing number and the dialed number- For example, the database can be a number 2 network control point (2NCP) and the query can be sent using SS7 TCAP (transaction capabilities application part). Control then passes to step 130 where the database receives the query and matches it to a customer record to obtain a jurisdictional classification of the call and to process features, based on the billing number, the calling party geographic location and/or the dialed number. Note that if a customer record does not exist, default values for service features and for the jurisdictional classification can be used. Control passes to step 140 where processing for any features that are allowed to derive a routing number (RN) differing from the DN. Additionally, any features not requiring a jurisdictional classification (i.e., local or toll) as an input can also be performed by step 140. Control then passes to conditional step 150.

Conditional step 150 tests whether the call is a local call from a routing perspective based on the calling party geographic location and the called party geographic location. The called party geographic location can be the dialed number itself or a routing number translated from the dialed number. If the call is not a local call from a routing perspective, then control passes to conditional step 230. If the call is a local call from a routing perspective, then control passes to conditional 160. Conditional step 160 tests whether the call is a local call from a billing perspective based on the calling party geographic location and the called party geographic location. If the call is not a local call from a billing perspective, then control passes to step 200. If the call is a local call from a billing perspective, then control passes to step 170. The jurisdictional classification of the call is determined from conditional steps that classify the call as either local or toll from a billing and routing perspective (e.g., conditional steps 150 and 160).

Step 170 processes local routing features, local billing features and any remaining generic features not previously processed by step 140 based on the billing number, the called party geographic location and/or the jurisdictional classification of the call, and then passes control to step 180. Step 180 routes the call as a local call and control passes to step 190. Step 190 bills the call as a local call and the process ends.

Step 200 processes local routing features, toll billing features and any remaining generic features not previously processed by step 140 based on the billing number, the called party geographic location and/or the jurisdictional classification of the call, and then passes control to step 210. Step 210 routes the call as a local call and control passes to step 220. Step 220 bills the call as a toll call and the process ends.

Conditional step 230 tests whether the call is a local call from a billing perspective based on the calling party geographic location and the called party geographic location. If the call is not a local call from a billing perspective, then control passes to step 260. If the call is a local call from a billing perspective, then control passes to step 230. Step 230 processes toll routing features, local billing features and any remaining generic features not previously processed by step 140 based on the billing number, the called party geographic location and/or the jurisdictional classification of the call, and then passes control to step 240. Step 240 routes the call as a toll call and control passes to step 250. Step 250 bills the call as a local call and the process ends.

Step 260 processes toll routing features, toll billing features and any remaining generic features not previously processed by step 140 based on the billing number, the called party geographic location and/or the jurisdictional classification of the call, and then passes control to step 270. Step 270 routes the call as a toll call and control passes to step 280. Step 280 bills the call as a toll call and the process ends.

Feature processing may not be necessary both before and after the call is classified as local or toll from a billing and routing perspective (see, e.g., conditional steps 150, 160 and 230). In other words, the features processed in step 140 may be the only features required and the features processed in steps 170, 200, 230 or 260 may not exist. Similarly, the features processed in steps 170, 200, 230 or 260 may be the only features required and the features processed in step 140 may not exist.

The present invention allows IXC switch 30 to act as the serving switch so that nodal customers can receive incoming calls using direct inward dial (DID) service. The DID service allows the number of trunk circuits connecting CPE 80 to the serving switch to be less than the number of telephone numbers supported by CPE 80.

The present invention allows telephone numbers assigned to CPE 80 to be ported to IXC switch 30 and contained within a routing table located at IXC switch 30. This allows a subscriber to change service providers while retaining its existing telephone numbers. When IXC switch 30 receives call setup information including the DN from an other network, IXC switch 30 verifies that the DN corresponds to a subscriber for which IXC switch 30 acts as a LSP. IXC switch 30 then routes the call to CPE 80.

It should, of course, be understood that while the present invention has been described in reference to particular system configurations and processes, other system configurations and processes should be apparent to those of ordinary skill in the art. For example, the present invention can include any number of communication devices, switches and CPE connected to a communication network or combination of communication networks.

What is claimed is:

1. A method for providing combined local service and toll service to a calling party through a switch connected to a communication network, comprising:

(a) receiving at the switch a call including a dialed number from the calling party;

(b) associating with the call a billing number based on trunk group data identifying a connection through which the dialed number was received;

(c) querying a database to identify a first feature based on at least one from the group of the billing number and the dialed number;

(d) processing the first feature identified in querying step (c);

(e) classifying the call into a jurisdictional classification based on a calling party geographic location and a called party geographic location, the called party geographic location being determined from the dialed number;

(f) returning routing information based on the jurisdictional classification of the call from the database to the switch; and (g) routing the call based on the jurisdictional classification of the call.

2. The method of claim 1, further comprising:

(h) processing a second feature based on at least one from the group of the billing number, the called party geographic location and the jurisdictional classification of the call, and being performed after step (e);

said step (d) being performed before step (e).

3. The method of claim 2, wherein processing step (d)(i) includes playing a message to the calling party through the switch and receiving responses from the calling party through the switch.

4. The method of claim 3, wherein the response includes dual tone multi-frequency (DTMF) audio signals selected by the calling party.

5. The method of claim 3, wherein the response includes speech by the calling party.

6. The method of clam 1, wherein the first feature is based on at least one from the group of the billing number, the dialed number and the jurisdictional classification of the call said step (d) being performed after step (e).

7. The method of claim 1, wherein the called party geographic location is a routing number translated from the dialed number in step (d), said step (d) being performed before step (e).

8. The method of claim 1, wherein step (f) further includes returning routing information from the database to the switch based on the first feature processing.

9. The method of claim 1, further comprising:

(h) recording the jurisdictional classification at the switch.

10. The method of claim 1, wherein classifying step (e) is performed from a routing perspective and from a billing perspective.

11. The method of claim 1, wherein the calling party geographic location is determined by any parameter associated with the trunk group data other than billing number.

12. The method of claim 11, wherein a local automatic number identification (LANI) parameter associated with the trunk group data determines the calling party geographic location.

13. The method of claim 1, wherein the calling party geographic location is determined from the billing numbers of the calling party.

14. The method of claim 1, wherein the calling party geographic location is determined from the database based on the billing number.

15. The method of claim 1 wherein the database contains a customer record accessed during step (d) based on at least one from the group of the billing number and the dialed number.

16. The method of claim 1, wherein processing step (d) includes playing a message to the calling party through the switch and receiving a response from the calling party through the switch.

17. The method of claim 16, wherein the response includes a dual tone multi-frequency (DTMF) audio signal selected by the calling party.

18. The method of claim 16, wherein the response includes speech by the calling party.

19. The method of claim 1, wherein classifying step (e) is based on a distinction between toll calls and local calls.

20. The method of claim 1, wherein classifying step (e) is based on a distinction between local calls, intraLATA toll calls, and interLATA toll calls.

21. A system for providing combined communication services including local service and toll service to a calling party, within a communication network, comprising:

an originating switch connected to the communication network, said originating switch receiving a call including a dialed number from the calling party, said originating switch associating with the call a billing number based on trunk group data identifying a connection through which the dialed number was received; and a database connected to said originating switch, said database being queried to identify a first feature based on at least one from the group of the billing number and the dialed number, said database processing the first feature, said database classifying the call into a jurisdictional classification based on a calling party geographic location and a called party geographic location, the called party geographic location being determined from the dialed number.

22. The system of claim 21, wherein said database processes a second feature based on at least one from the group of the billing number, the called party geographic location and classification of the call, said database processes the first feature before the call is classified and processes the second feature after the call is classified.

23. The system of claim 21, wherein said database processes the first feature based on at least one from the group of the billing number, the called party geographic location and classification of the call, the database processes the first feature after the call is classified.

24. An apparatus for providing combined communication services to a calling party, within a communication network, comprising:

an originating switch connected to the communication network, said originating switch receiving a call including a dialed number from the calling party, said originating switch associating with the call a billing number based on trunk group data identifying a connection through which the dialed number was received, said originating switch including:

a database, said database being queried to identify a first feature based on at least one from the group of the billing number and the dialed number, said database processing the first feature, said database classifying the call into a jurisdictional classification based on a calling party geographic location and a called party geographic locations the called party geographic location being determined from the dialed number.

25. The method of claim 24, wherein said database processes a second feature based on at least one from the group of the billing number, the called party geographic location and classification of the call, the second feature is processed after said database classifies the call.

26. The system of claim 24, wherein said database processes the first feature based on classification of the call after said database classifies the call.

27. An apparatus for providing combined communication services including local service and toll service to a calling party, within a communication network, comprising:

means for receiving a call including a dialed number from the calling party;

means for associating with the call a billing number based on trunk group data identifying a connection through which the dialed number was received;

means for querying a database to identify a feature based on at least one from the group of the billing number and the dialed number; and means for classifying the call into a jurisdictional classification based on a calling party geographic location and a called party geographic location, the called party geographic location being determined from the dialed number.

* * * * *